United States Patent [19]
Wilson

[11] 3,769,793
[45] Nov. 6, 1973

[54] POWER PLANT

[76] Inventor: Frank H. Wilson, 545 Store Rd., RD 1, Harleysville, Pa.

[22] Filed: Aug. 2, 1972

[21] Appl. No.: 277,155

[52] U.S. Cl. ............ 60/39.16 R, 60/39.44, 60/39.51
[51] Int. Cl. .............................................. F02c 3/10
[58] Field of Search .................... 60/39.44, 39.51 R, 60/39.16; 416/146

[56] References Cited
UNITED STATES PATENTS

| | | | |
|---|---|---|---|
| 3,237,405 | 3/1966 | Preston | 60/39.51 R |
| 3,349,248 | 10/1967 | Garnier | 60/39.51 R |

FOREIGN PATENTS OR APPLICATIONS

| | | | |
|---|---|---|---|
| 123,339 | 2/1919 | Great Britain | 60/39.44 |
| 40,094 | 6/1907 | Switzerland | 60/39.44 |

OTHER PUBLICATIONS

"The American Inventor" Vol. 15, No. 4, (pg. 101) Publ. at 114–118 Liberty St., N.Y., N.Y. April, 1906.

*Primary Examiner*—Carlton R. Croyle
*Assistant Examiner*—Warren Olsen
*Attorney*—Dexter N. Shaw et al.

[57] ABSTRACT

A compact power plant which is capable of being operated by one or more sources of energy, including electrical energy and thermal energy, is provided for use particularly in an automotive environment. The power plant includes a housing, an output shaft rotatably mounted in the housing, a motor-generator assembly and first and second stage turbines connected to the shaft. The first stage turbine has a series of blades which are mounted on a flywheel to travel in a circular path around the motor-generator. The flywheel is rotated by means of exhaust gases resulting from the combustion of fuel in a series of expansion chambers which are disposed in a ring located inwardly of the path of movement of the blades. A like series of exhaust chambers are interposed between the expansion chambers in the ring, and a continuous annular exhaust receiver surrounds the blades to receive exhaust gases expelled from the exhaust chambers. Inner and outer cylindrical partitions are provided on opposite sides of the path of movement of the blades and sealing means is provided at spaced intervals between groups of blades to prevent the leakage of combustion gases directly from the expansion chambers and to the exhaust chambers. An air-fuel mixture is ignited simultaneously in the expansion chambers by means of igniters, and the air is preheated before combustion as it flows through a conduit located in the exhaust receiver. A portion of the combustion air is admitted to the exhaust chambers to effect scavenging and further combustion of exhaust gases. The rotor of the second stage turbine is connected to the shaft and is supplied with exhaust gases by conduits leading from the exhaust receiver. The power plant is capable of generating electricity for storage in a battery when the turbines rotate the shaft; or, the shaft is capable of being driven by electricity supplied to the motor-generator assembly from a battery.

9 Claims, 4 Drawing Figures

United States Patent
Wilson
[11] 3,769,793
[45] Nov. 6, 1973
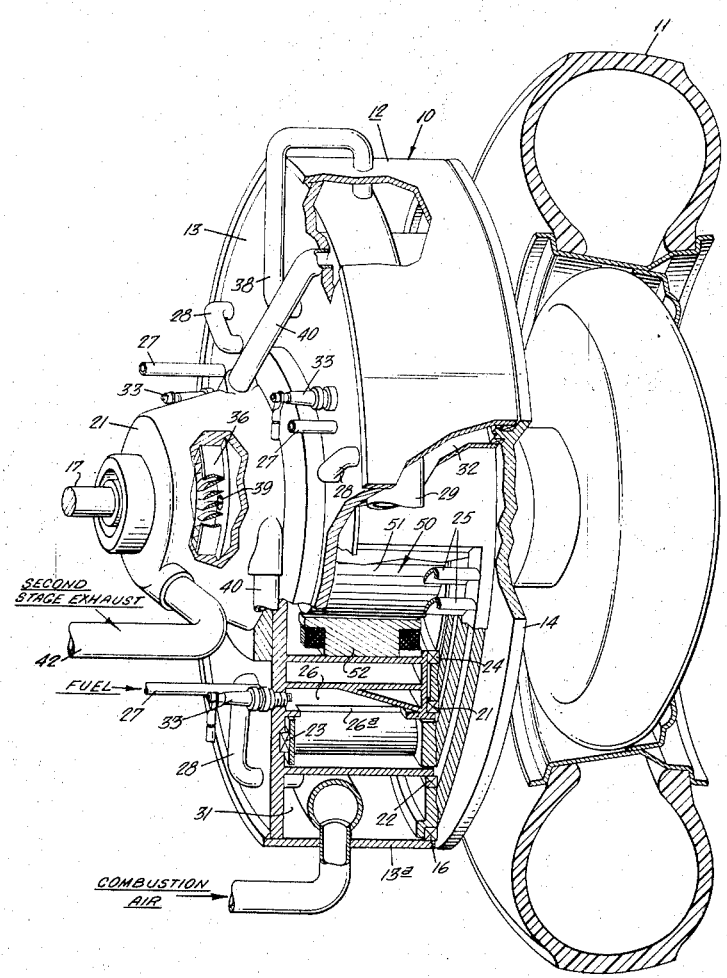

Patented Nov. 6, 1973 3,769,793

Patented Nov. 6, 1973

POWER PLANT

The present invention relates to power plants, and more particularly, the present invention relates to automotive-type power plants which are capable of being operated either by means of electrical energy or by thermal energy produced by the combustion of fuel within the power plant.

At present, there is a growing concern in urban areas about atmospheric pollution caused by the exhaust emissions from internal combustion engines. Heretofore, known automotive power plants have been limited to single sources of energy, such as electrical energy stored in batteries or thermal energy generated by the combustion of hydrocarbon fuels. Although automobiles powered solely by electrical energy would alleviate some of the urban pollution problems, such automobiles would not be publicly accepted because of their inherent speed and range limitations. However, an automotive power plant which could combine the pollution abatement attributes of electrical operation while in an urban environment with the speed and range attributes of an internal combustion engine is highly desirable.

In U.S. Pat. No. 2,898,736 there is disclosed a power plant in which the products of combustion of a hydrocarbon fuel are directed inwardly against pockets in a rotor and are exhausted outwardly therefrom when the pockets register with exhaust ports. Although this engine may operate satisfactorily, its efficiency may not be entirely satisfactory because the absence of sealing means between the rotor and a wall which surrounds its periphery permits some of the combustion gases to flow around the rotor and to the exhaust ports. Since this engine is incapable of operating from a source of electrical energy, it would not help to alleviate some of the urban pollution problems when installed in an automobile.

With the foregoing in mind, it is a primary object of the present invention to provide a novel power plant which is capable of being operated by electrical energy or thermal energy.

It is another object of the present invention to provide an improved automotive power plant which is capable of efficient operation with a minimum of moving parts while being relatively economical to manufacture and maintain.

It is a still further object of the present invention to provide an automotive power plant which is capable of alleviating atmospheric pollution.

More specifically, the present invention provides a power plant which is capable of being operated either by electrical energy or by thermal energy. The power plant comprises an output shaft which is rotatably mounted in a cylindrical housing having a stationary end wall and a rotary end wall or fly wheel connected to the shaft. Electro-motive means in the form of a motor-generator assembly is contained within the housing and is connected to the shaft for rotating the same when supplied with electrical energy or for generating electricity when the shaft is rotated. The shaft can be rotated by means of first and second stage turbines. The first stage turbine includes arrays of blades mounted on the flywheel and extending into the housing. A combustible mixture of air and fuel is supplied to and simultaneously ignited in a series of expansion chambers which are spaced apart in a ring located inwardly of the path of movement of the blades. A series of exhaust chambers are located intermediate the expansion chambers in the ring, and the burning mixture is exhausted into a continuous annular receiver surrounding the blades. The exhaust and expansion chambers are interconnected by means of an annular passage formed between inner and outer partitions located on opposite sides of the path of movement of the blades. Sealing means is provided between arrays of blades for sealing the passage between the partitions and the chambers to prevent exhaust gases from escaping directly to the exhaust chambers from the expansion chambers. A conduit is mounted in the exhaust receiver to preheat the combustion air, and a portion of the pre-heated combustion air is introduced to the exhaust chambers to scavenge the exhaust products and to effect further combustion.

These and other objects, features and advantages of the present invention should become apparent from the following description when taken in conjunction with the accompanying drawings, in which.

Figure 1:
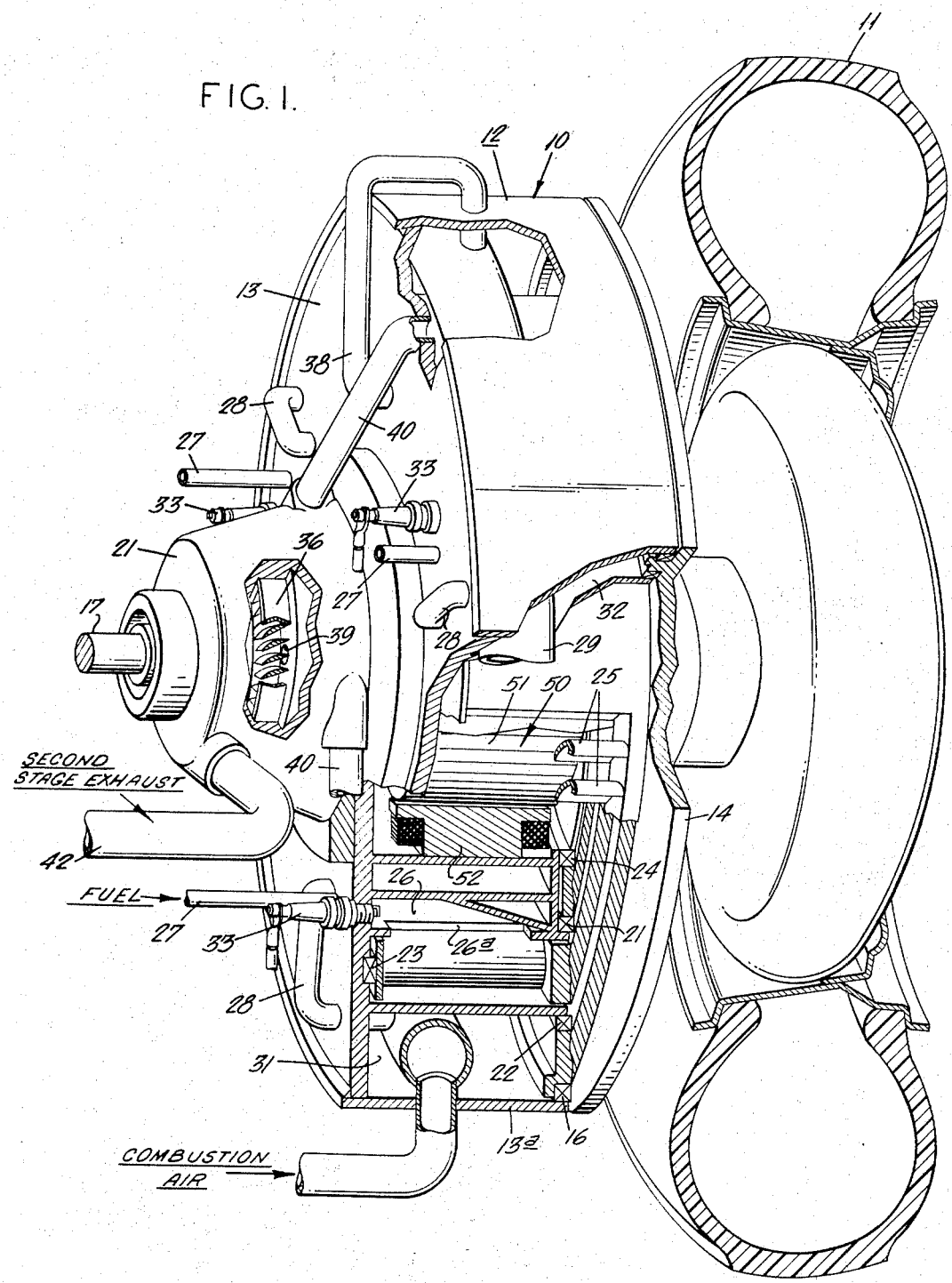
FIG. 1 is a perspective view of a power plant embodying the present invention, portions of the power plant being broken away to expose its interior.

Referring now to the drawings, there is illustrated in FIG. 1 a power plant 10 embodying the present invention. As illustrated therein, the power plant 10 is coupled directly to a wheel 11 of a vehicle without an intervening transmission. It should be understood, of course, that the power plant 10 is capable of being installed as a main power plant for driving the wheels of a vehicle through a conventional drive train. However, when a power plant is provided for each wheel of a four wheel vehicle, it should be apparent that a considerable amount of traction is provided, thereby enabling the vehicle to travese rough and/or slippery terrain.

Figure 3:
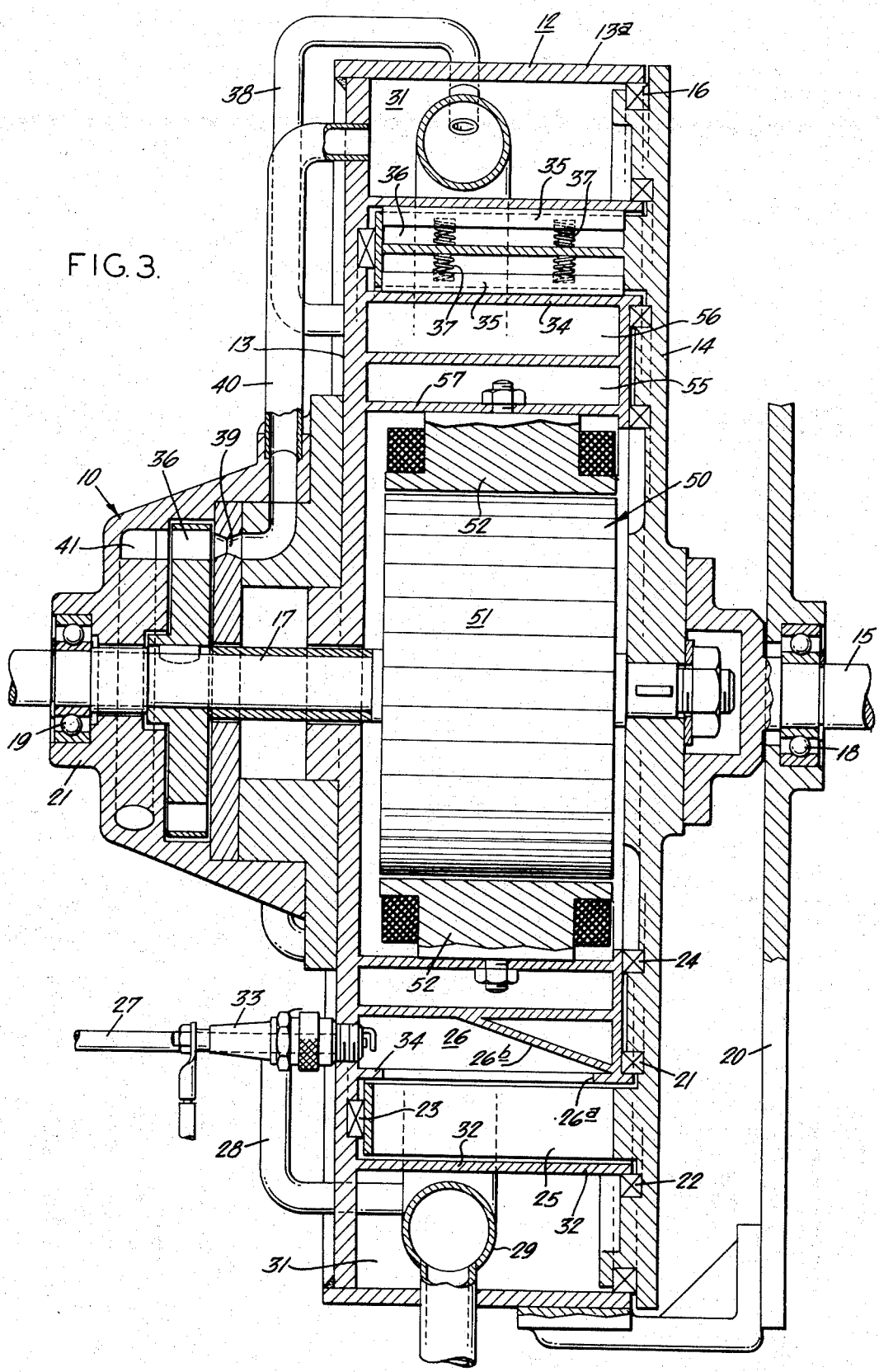
FIG. 3 is an enlarged sectional view taken along line 3—3 of FIG. 2.

The power plant 10 is capable of being operated by electrical energy or by thermal energy generated by the combustion of hydrocarbon fuels, such as kerosene, gasoline, alcohol or the like. To this end, the power plant 10 includes a housing 12 of a shallow cylindrical configuration having a stationary circular end wall 13 with a peripheral flange portion 13a and circular rotary wall or flywheel 14 spaced axially from the end wall 13. As seen in FIG. 3, the flywheel 14 is sealed along its juncture with the edge of the flange 13a by means of a gasket 16. Thus, the interior of the housing 12 is able to contain a motive fluid such as hot exhaust gases under pressure without leakage.

The flywheel 14 is connected to an output shaft 15 which, in the present instance, is coupled directly to the wheel 11. The flywheel 14 is also connected to another shaft 17 which is coaxial with the output shaft 15 and which extends leftward through the housing 12. The shafts 15 and 17 are rotatably supported by means of bearings 18 and 19, respectively, the bearing 18 being mounted in a bracket 20 and the bearing 19 being mounted in a shroud 21 mounted to the stationary end wall 13. Thus, rotation of either shaft 15 or 17 causes the flywheel 14 to rotate and vice versa.

In order to rotate the flywheel 14 by means of thermal energy, the power plant 10 is provided with means for effecting combustion of fuel within the housing 12 and for causing the combustion gases to rotate the flywheel 14 and the shafts 15 and 17. To this end, a first stage turbine is provided by means of a series of fluid reaction surfaces or blades 25,25 which are mounted on the flywheel 14 and which extend into the housing 12 parallel to the shaft 17. The blades 25,25 are disposed in arrays, such as the arrays A and B illustrated in FIG. 2, and the arrays mounted at equally-spaced locations on the flywheel 14 to travel in a circular path as the flywheel 14 rotates. Each blade 25 is provided with a shaped cross-section so as to react efficiently with the exhaust gases to rotate the flywheel 14.

Figure 2:
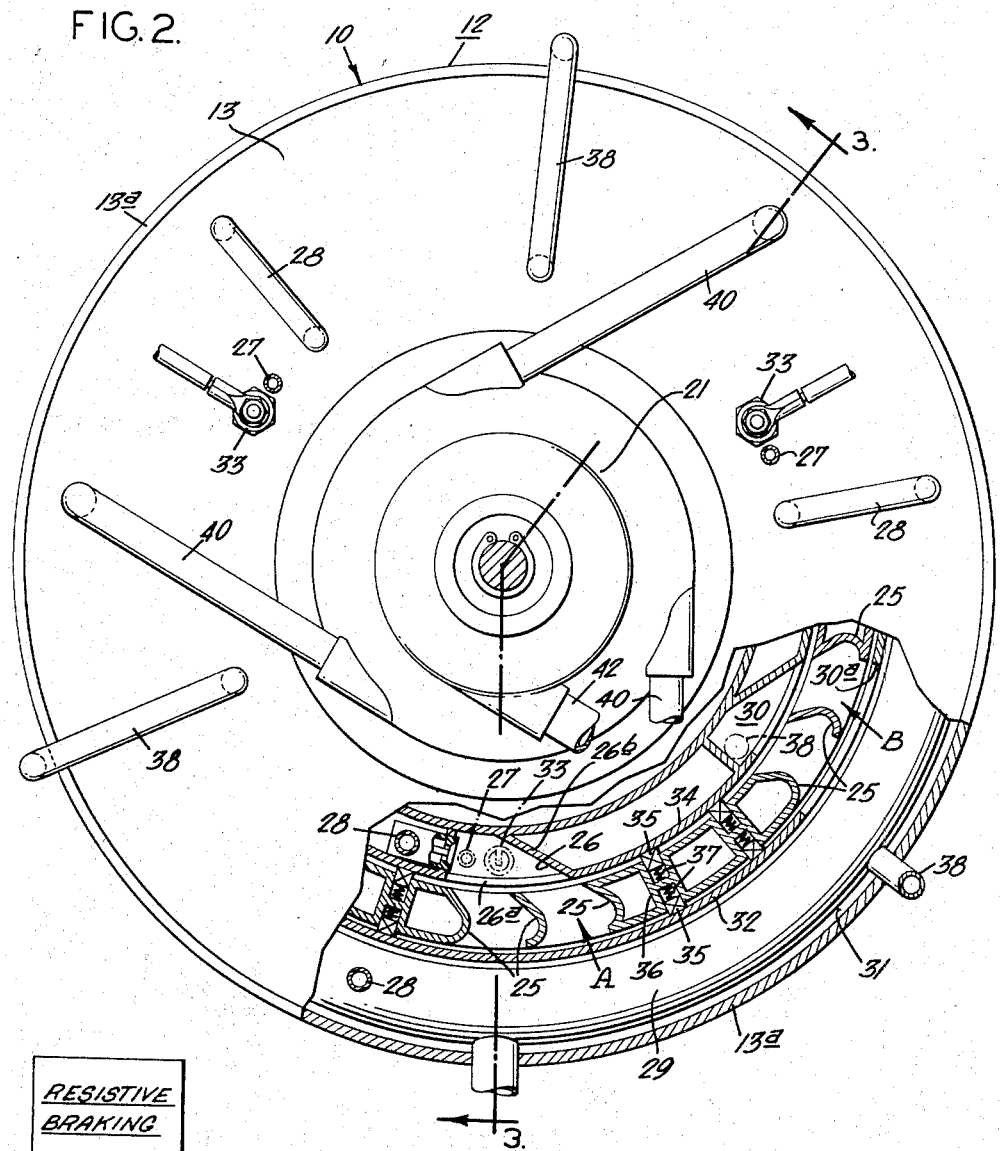
FIG. 2 is an end elevational view of the power plant illustrated in FIG. 1, the power plant having a portion of its housing broken away to expose elements of its first stage turbine.

The blades 25,25 advance and the flywheel 14 rotates in the direction indicated by the arrow in FIG. 2 in response to combustion of fuel in the housing 12. To this end, a plurality of expansion or combustion chambers 26,26 are disposed at equally spaced locations in a ring located inwardly of the path of movement of the blades 25,25, and an annular exhaust receiver 31 surrounds the blades 25,25 and is provided between the flange 13a and an outer cylindrical partition 32 which surrounds the path of movement of the blades 25,25. An inner cylindrical partition 34 is located inwardly of the path of movement of the blades 25,25, and the combustion chambers 26,26 are in communication with the spaces between the blades 25,25 in each array through ports 26a,26a in the inner partition 34. As best seen in FIG. 3, annular gaskets 21 and 22 are provided adjacent the juncture of the edges of the inner and outer partitions 34 and 32, respectively with the flywheel 14 to prevent leakage of exhaust gases. An annular gasket 23 is provided along and between the edges of the blades 25,25 and the end wall 13. In addition, an annular gasket 24 is provided inwardly of the gasket 21 to effect further leak resistance.

A combustable mixture of air and fuel is supplied under pressure to each combustion chamber 26 through fuel lines 27,27 and air supply lines 28,28 which connect to a common supply header 29. The mixture is ignited simultaneously in each combustion chamber 26 by means of an ignitor or spark generator 33 which is mounted in the stationary end wall 13 and which projects into the combustion chamber 26. In the present instance three expansion chambers are provided, and one ignitor is provided for each chamber. Preferably, each combustion chamber 26 has an inclined wall 26b which operates to direct the combustion gases radially outward into the spaces between the blades 25,25.

A series of exhaust chambers 30,30, corresponding in number to the expansion chambers 26,26, are disposed intermediate the combustion chambers 26,26 in the ring. Thus, for each expansion chamber 26 there is a corresponding exhaust chamber 30 which is located a spaced peripheral distance from its companion expansion chamber. With this structure, combustion gases which expand in one expansion chamber into the spaces between the blades 25,25 are not exhausted until the blades advance into registry with its companion exhaust chamber.

In order to prevent combustion gases from flowing directly to the exhaust chambers 30,30 from the combustion chambers 26,26, without flowing into the spaces between the blades 25,25, sealing means is provided between the chambers and the arrays of blades 25,25. As best seen in FIG. 2, the sealing means includes pairs of sealing members 35,35 mounted in receptacles 36,36 carried on the flywheel 14. The members 35,35 are biased radially into engagement with the partitions 32 and 34 by means of compression springs 37,37 mounted in the receptacles 36,36. As a result, combustion gases generated in the combustion chambers 26,26 act directly on the blades 25,25 and the sealing members 35,35 to rotate the flywheel 14 in the counterclockwise direction before exiting from the exhaust ports 30a,30a and into the exhaust receiver 31. Preferably, the sealing members are fabricated on a self-lubricating material such as oil-impregnated bronze.

The sealing members 35,35 are prevented from becoming disassociated from their receptacles 36.36 as the members 35,35 advance through the combustion and exhaust chambers. To this end, the sealing members are each provided with a lengthwise dimension which is greater than the corresponding dimension of the exhaust chamber ports 30a,30a and the combustion chamber ports 26a,26a. Thus, the sealing members 35,35 are engaged at least at their opposite ends as they advance through the chambers and past the ports 30a and 26a.(See FIG. 3)

Although the power plant 10 is efficient in operation, the efficiency is improved by preheating the combustion air before it is introduced to the combustion chambers 26,26. For this purpose, the air supply header 29 is mounted in the exhaust receiver 31. Thus, as air flows through the header 29 to the combustion chambers 26,26 the air absorbs heat from the exhaust gases in the receiver 31, thereby increasing the thermal efficiency of the power plant 10.

In addition to providing means to pre-heat the combustion air, a portion of the preheated combustion air is introduced to the exhaust chambers 30,30 to scavenge exhaust gases from the exhaust chambers 30,30 while supplying additional air to completely burn any fuel which had not been completely burned in the combustion chambers 26,26. For this purpose, U-shaped tubes or conduits 38,38 are connected between the air supply header 29 and each exhaust chamber 30. By introducing supplemental air to the exhaust chambers at these locations substantially complete combustion occurs, and the exhaust emissions contain relatively small amounts of noxious gases.

In order to extract additional energy from the exhaust gases in the receiver 31, a sound stage turbine is provided. As best seen in FIG. 3, the second stage turbine includes an impeller 36 which is connected directly to the shaft 17 and which is contained in the shroud 21 mounted to the stationary end wall 13. A series of nozzles such as the nozzle 39 introduce exhaust gases to the impeller 26 at three peripheral locations, the exhaust gases being supplied to each nozzle 39 by means of conduits 40 which extend from the exhaust receiver 31 and to the shroud 21 tangentially to the impeller 36. An annular exhaust cavity 41 is provided inside the shroud 21 on the side of the impeller 36 opposite the nozzles 39,39 for receiving the exhaust gases after they react with the impeller 36. A pipe 42 connects the exhaust cavity 41 to the atmosphere through a suitable muffler and/or catalytic converter which is capable of further removing noxious gaseous and like pollutants from the exhaust gases.

Figure 4:
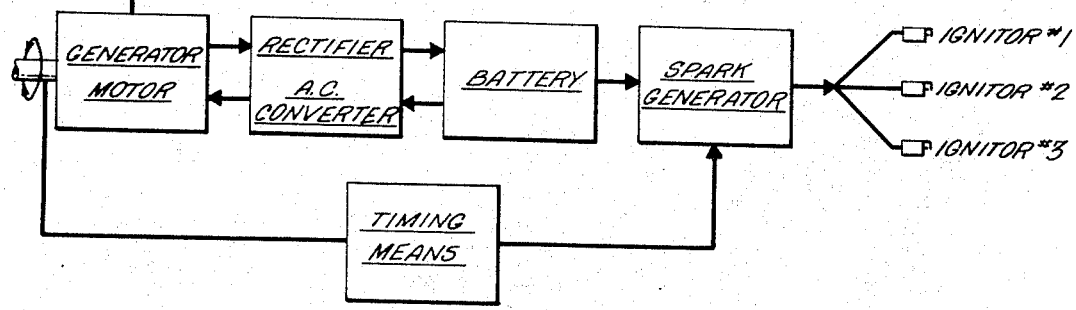
FIG. 4 is a schematic block diagram of an electrical system associated with the power plant.

The power plant 10 is capable either of operating on electrical energy or of generating electrical energy for storage and use at a later time. To this end, electromotive means in the form of a motor-generator assembly 50 is provided within the housing 12. As best seen in FIG. 3, the motor-generator assembly includes an armature or rotor 51 which is connected to the shaft 17 and a stator 52 which surrounds the rotor 51 and provides a means for generating a magnetic field about the rotor 51. As one skilled in the art would readily understand, the rotor 51 and stator 52 operate in accordance with well known principles to generate electrical energy or to apply torque to the shaft 17. It is noted that an alternator type of current generator is preferred in order to eliminate contact brushes; however, when such a current generator is employed, a means must be provided intermediate the current generator and the battery to convert alternating current to direct current for storage and vice versa for use (see FIG. 4). The provision of the motor-generator 50 in the power plant 10 is particularly advantageous when the power plant 10 is installed in a vehicle since the generator can then be used to apply a braking action to the shaft 15 for slowing or stopping the vehicle. Preferably, the current generated in braking is dissipated in the form of heat from a bank of resistors indicated schematically in the block entitled Resistive Braking in FIG. 4.

It should be apparent that the motor-generator assembly 50 provides a dual function in the power plant 10. For instance, it is capable of rotating the shaft when the first stage turbine is deactivated so that when installed in an automobile, the automible is capable of operating on non-polluting electrical energy while in an urban environment. In addition, the motor-generator assembly 50 may be used to bring the flywheel 14 up to a minimum rotational velocity, such as a nominal 100 rpm before the first stage turbine is activated.

In normal operation, the motor-generator assembly accelerates the flywheel 14 until the minimum speed is reached at which time the first stage turbine is activated by causing fuel and air to be supplied to the combustion chambers 26,26 through supply lines 27 and 28, respectively. The mixture is ignited simultaneously in each chamber when the blades 25,25 register with the expansion chambers 26,26 by means of the ignitors 22 which receive their power from a pulse or spark generator which is connected to a battery as indicated schematically in FIG. 4. Various types of timing means are capable of generating the spark and delivering the same in proper timed relation with the rotation of the shaft. Such apparatus is not described in detail herein because they are well known to skilled mechanics. Such timing means is indicated schematically in FIG. 4.

As the mixture burns in the expansion chambers 26,26 the resulting exhaust gases flow into the spaces between the blades 25,25 through the ports 26a,26a in the inner partition 34. The exhaust gases are contained under pressure between the blades 25,25 as they advance through the sealed zones between adjacent expansion and exhaust chambers, and the exhaust gases flow out of the spaces between the blades 25,25 and through the exhaust chambers ports 30a,30a as the blades 25,25 advance through the exhaust chambers 30,30. The flowing gases act against the blades to apply torque to the flywheel 14 and hence to rotate the shafts 15 and 17. It is noted that the pressure created by the expansion of the exhaust gases acts on the small exposed lengthwise edges of the sealing members 35,35 to apply additional torque to the flywheel 14 and hence to the shafts 15 and 17.

As the blades 25,25 advance through the exhaust chambers 30,30, the pre-heated supplemental air introduced into the exhaust chambers 30,30 through the tubes 38,38, causes further combustion to occur. Thus, any unburned fuel which may be present is ignited, and further thermal energy is extracted and utilized by the expanding gases as they act against the blades 25,25 while flowing outwardly through the exhaust ports 30a,30a en route to the exhaust receiver 31.

The exhaust gases which enter the receiver 31 are then introduced to the impeller 36 of the second stage turbine through the conduits 35,35. The gases further expand and act against the impeller 36 to apply a further amount of torque to the shafts 15 and 17. The exhaust gases are conducted away from the impeller 36 and to the atmosphere through the exhaust cavity 41 and the pipe 42.

It is noted that even though a major portion of the thermal energy generated inside the power plant 10 is converted into work, it may be necessary to provide internal cooling for the power plant 10. This can be readily accomplished by flowing a coolant through annular passages 55 and 56 which are located inwardly adjacent the combustion and exhaust chambers 26 and 30, and which are provided between the inner partition 34 and a partition 57 which surrounds the stator 52. The annular passage 56 is wedge shaped and is provided between the inner partition 34 and the angled wall 26b in the combustion chamber 26. Since various types of conventional cooling apparatus may be provided for the purpose of flowing a cooling medium through these passages, such apparatus need not be described in greater detail herein.

The power plant 10 is capable of operating on pressure fluids such as compressed air or steam. This may be accomplished by supplying such pressure fluid to the expansion chambers 26,26 through the air supply header 29 and associated conduits 28,28. In such event, of course, the ignitors would either be plugged or otherwise rendered inactive.

In the event that maintenance is necessitated on the power plant, the entire flywheel 14 is capable of being removed. Thus, ready access is afforded to the entire interior of the power plant 10. This construction also enables the power plant to be assembled with relative ease. Hence, the power plant can be manufactured economically.

In view of the foregoing, it should be apparent that a novel power plant has now been provided for use in an automotive vehicle. The power plant is capable of being operated by various sources of energy, including electrical energy or thermal energy generated by the combustion of a fuel within the power plant or supplied to the power plant from a separate generator such as a steam boiler. The power plant is efficient in operation, and it is relatively economical to manufacture and maintain because it possesses a minimum of moving parts.

While a preferred embodiment of the present invention has been described in detail, various modifications, alterations and changes may be made without depart-

I claim:

1. A power plant comprising:
   a shaft,
   a flywheel connected to said shaft,
   means providing a plurality of arrays of fluid reaction surfaces at peripherally-spaced locations on said flywheel for rotation in a circular path about said shaft,
   means providing an inner and an outer partition surrounding said shaft in said housing and located on opposite sides of the path of movement of said fluid reaction surfaces,
   means providing a series of fluid expansion chambers disposed in a ring located inwardly of said circular path for introducing a fluid to said reaction surfaces through a like series of ports in said inner partition,
   means for admitting a combustible mixture into said expansion chambers and means for simultaneously igniting said mixture therein when said surfaces register with said expansion chambers,
   housing means surrounding said outer partition to form an annular exhaust receiver outwardly of said circular path,
   means providing a series of exhaust chambers corresponding in number to said fluid expansion chambers and disposed intermediate said expansion chambers in said ring, said outer partition having exhaust ports providing fluid communication between said exhaust chambers and said exhaust receiver,
   means for admitting a portion of said combustion air to each of said exhaust chambers for effecting further combustion of fuel in said exhaust chambers and scavenging of the products of combustion therefrom and into the exhaust receiver,
   electromotive means mounted in said housing and associated with said shaft to rotate said shaft when electrical energy is supplied thereto and to generate electricity in response to rotation of said shaft,
   a second stage turbine having an impeller connected to said shaft, means to deliver exhaust fluid from said exhaust receiver and to said impeller, and means to remove exhaust fluid from said impeller, so that fluid expanding in the expansion chambers is contained between the fluid reaction surfaces until said surfaces register with the exhaust chambers wherein the supplemental air effects further combustion and the fluid flows through the exhaust ports and into the receiver for flowing through the second stage turbine before exiting the power plant.

2. Apparatus according to claim 1 wherein said mixture includes air and a fuel and including conduit means located in said exhaust receiver for admitting said air to said expansion chambers, whereby the air is heated by the exhaust gases in the exhaust receiver before being supplied to the expansion chambers.

3. Apparatus according to claim 1 wherein said housing means includes a stationary end wall having a transverse portion rotatably mounting said shaft and a peripheral flange portion surrounding said shaft, said flywheel being secured to said shaft a spaced axial distance from said transverse portion for cooperating therewith to define said annular exhaust receiver between said flange and said outer partition, and including gasket means located between said flywheel and the edge of said peripheral flange and said partitions and between said fluid reaction surfaces and said transverse wall for preventing leakage of exhaust gases from said combustion and exhaust chambers and said exhaust receiver.

4. Apparatus according to claim 3 wherein said igniting means includes separate ignitors mounted in said stationary wall in registry with said expansion chambers, and means for energizing said ignitors in timed relation with rotation of said shaft.

5. Apparatus according to claim 3 wherein said electro-motive means is located inside said circular path of movement of said fluid reaction surfaces and between said stationary wall and said flywheel.

6. Apparatus according to claim 3 including a shroud mounted to said stationary wall for enclosing said impeller and rotatably mounting said shaft, and said exhaust fluid delivery means including a plurality of conduits providing fluid communication between the interior of said shroud and equally-spaced locations in said exhaust receiver.

7. Apparatus according to claim 3 including a vehicle wheel connected to said shaft adjacent said flywheel.

8. Apparatus according to claim 1 wherein said sealing means includes at least a pair of sealing members extending parallel to said shaft, a receptacle carried by said flywheel for mounting said members for displacement in a radial direction, and means in said receptacle for biasing said sealing members in said radial direction against said partitions, whereby a fluid tight seal is provided in said sealed zones.

9. Apparatus according to claim 8 wherein said sealing members and partitions have corresponding dimensions measured parallel to said shaft, and said expansion and exhaust chambers and said exhaust ports have dimensions less than said corresponding dimensions, so that the sealing members are continuously supported at least at their opposite ends as the flywheel rotates and the fluid reaction surfaces pass through the combustion and exhaust chambers.

* * * * *